US009397582B2

(12) United States Patent
Wang et al.

(10) Patent No.: US 9,397,582 B2
(45) Date of Patent: Jul. 19, 2016

(54) POWER CONVERTER, AND INVERTER DEVICE INCLUDING THE POWER CONVERTER

(71) Applicant: FUJI ELECTRIC CO., LTD., Kawasaki (JP)

(72) Inventors: Qichen Wang, Hino (JP); Satoru Fujita, Tachikawa (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 14/638,758

(22) Filed: Mar. 4, 2015

(65) Prior Publication Data
US 2015/0180368 A1    Jun. 25, 2015

Related U.S. Application Data

(63) Continuation of application No. PCT/JP2012/006295, filed on Oct. 2, 2012.

(51) Int. Cl.
*H02M 7/537* (2006.01)
*H02M 7/487* (2007.01)
*H02M 1/00* (2007.01)
*H02M 1/10* (2006.01)
(Continued)

(52) U.S. Cl.
CPC ............. *H02M 7/539* (2013.01); *H02M 1/10* (2013.01); *H02M 1/12* (2013.01); *H02M 5/293* (2013.01); *H02M 7/487* (2013.01); *H02M 7/49* (2013.01); *H02M 7/537* (2013.01); *H02M 2001/0012* (2013.01); *H02M 2005/2932* (2013.01)

(58) Field of Classification Search
CPC ............................. H02M 7/537; H02M 7/42
USPC .................. 363/65, 71, 72, 97, 98, 131–132, 363/16–17, 37, 41, 147, 144
See application file for complete search history.

(56) References Cited

U.S. PATENT DOCUMENTS 6,459,606 B1   10/2002   Jadrić
7,391,132 B2 *  6/2008   Chen ....................... H02J 9/062
                                                                 307/43
(Continued)

FOREIGN PATENT DOCUMENTS

EP    2107672    10/2009
EP    2424100     2/2012
(Continued)

OTHER PUBLICATIONS

International Search Report mailed on Dec. 18, 2012 in corresponding International Patent Application No. PCT/JP2012/006295.
(Continued)

*Primary Examiner* — Timothy J Dole
*Assistant Examiner* — Bryan R Perez

(57) ABSTRACT

In a power converter, in a period in which the polarities of output voltage and output current of a power converter differ, a pulse train voltage corresponding to a PWM signal is output by a first switching element and a second switching element being turned off, one element of a first switch element and a second switch element being turned on, and the other element being turned on and off based on an inverted signal of a PWM signal pulse width modulated in accordance with an output voltage command.

19 Claims, 10 Drawing Sheets

(51) Int. Cl.
    *H02M 7/49*     (2007.01)
    *H02M 7/539*     (2006.01)
    *H02M 5/293*     (2006.01)
    *H02M 1/12*     (2006.01)

(56) References Cited

U.S. PATENT DOCUMENTS

| | | | |
|---|---|---|---|
| 7,656,689 B2* | 2/2010 | Yoshimoto | H02M 7/53875 363/71 |
| 2006/0119184 A1 | 6/2006 | Chen | |
| 2009/0244936 A1* | 10/2009 | Falk | H02M 7/487 363/40 |
| 2010/0295374 A1 | 11/2010 | Nielsen et al. | |
| 2012/0018777 A1 | 1/2012 | Takizawa | |
| 2012/0092915 A1 | 4/2012 | Okuda et al. | |
| 2013/0235625 A1 | 9/2013 | Yamada | |

FOREIGN PATENT DOCUMENTS

| | | |
|---|---|---|
| JP | 7-46849 | 2/1995 |
| JP | 11-89239 | 3/1999 |
| JP | 2002-247862 | 8/2002 |
| JP | 2003-230276 | 8/2003 |
| JP | 2003-230277 | 8/2003 |
| JP | 2006-296098 | 10/2006 |
| JP | 2007-028860 | 2/2007 |
| JP | 2011-61883 | 3/2011 |
| JP | 2012-29429 | 2/2012 |
| WO | WO 2012/067167 A1 | 5/2012 |

OTHER PUBLICATIONS

PCT Written Opinion of the International Searching Authority, Date: Dec. 18, 2012.
Extended European Search Report dated Apr. 15, 2016 in corresponding European Patent Application No. 12886023.6, 7 pages.

* cited by examiner

US 9,397,582 B2

POWER CONVERTER, AND INVERTER DEVICE INCLUDING THE POWER CONVERTER

CROSS-REFERENCE TO RELATED APPLICATIONS

This is a continuation application, filed under 35 U.S.C. §111(a), of International Patent Application No. PCT/JP2012/006295 filed on Oct. 2, 2012, the disclosure of which is incorporated herein by reference.

BACKGROUND

1. Field

The present disclosure relates to an inverter device such that, even when there is a region in which flows current of a phase lagging with respect to the voltage of an alternating current output, it is possible to reduce output voltage waveform distortion.

2. Description of Related Art

Three-level inverter devices that generate alternating current voltage from three direct current potentials are being put to practical use in a wide field of industry. A schematic configuration of an inverter device that can output phase voltage at three levels of potential is shown in FIG. 11. This kind of inverter device is disclosed in JP-A-2007-028860. In FIG. 11, 1 is a direct current power supply, 2 is an inverter circuit, 3 is a filter circuit, and 4 is a load. The direct current power supply 1 is a power supply wherein a positive side power supply Psp and a negative side power supply Psn are connected in series. Output terminals of the direct current power supply 1 are a positive side terminal P of the positive side power supply Psp, a negative side terminal N of the negative side power supply Psn, and a neutral point terminal C, which is a connection point of the positive side power supply Psp and negative side power supply Psn. The positive side terminal P outputs a positive voltage V1 of the positive side power supply Psp. The negative side terminal N outputs a negative voltage −V2 of the negative side power supply Psn. The neutral point terminal C outputs a zero voltage Vz, which is an intermediate voltage of the direct current power supply 1.

The inverter circuit 2 is configured of switching elements Q1 and Q2 and switch elements S1 and S2. The switching elements Q1 and Q2 are connected in series, and connected to both ends of the direct current power supply 1. A connection point of the switching elements Q1 and Q2 is an output terminal U that outputs an alternating current voltage Vout. The switch elements S1 and S2 are connected in anti-parallel, configuring a bidirectional switch BS. The bidirectional switch BS is connected between the neutral point terminal C and the output terminal U. The filter circuit 3 is a circuit formed by a reactor Lf and capacitor Cf being connected in series. The filter circuit 3 is connected between the output terminal U and the neutral point terminal C. The load 4 is connected to both ends of the capacitor Cf. A sinusoidal load voltage Vload obtained by eliminating harmonic components from the output voltage Vout of the inverter circuit 2 is output to both ends of the capacitor Cf.

Firstly, a description will be given of an operation of the inverter circuit 2 when a load voltage Vload with positive polarity is output. FIG. 12 is a diagram showing the relationship between a control signal of each element and output voltage Vout. Each element is turned on when the control signal thereof is at a high level (hereafter referred to as H), and turned off when the control signal thereof is at a low level (hereafter referred to as L). FIG. 12 part (a) shows the temporal change of a first pulse width modulation signal (PWM signal 1). The PWM signal 1 is a signal that forms a reference for generating the control signals of the switching element Q1 and switch element S2. The PWM signal 1 repeatedly switches between H and L. The control signal of the switching element Q1 is H or L in synchronization with the PWM signal 1 (FIG. 12 part (c)). The control signal of the switch element S2 inverts the H and L of the PWM signal 1, and is a signal to which an idle period Td is added (FIG. 12 part (f)). The idle period Td is a period for turning the two elements off together in order to prevent a short-circuiting of the switching element Q1 and switch element S2.

FIG. 12 part (b) shows the temporal change of a second pulse width modulation signal (PWM signal 2). The PWM signal 2 is a signal that forms a reference for generating the control signals of the switching element Q2 and switch element S1. The PWM signal 2 is constantly L in this period. The control signal of the switching element Q2 is constantly L, in accordance with the PWM signal 2 (FIG. 12 part (d)). The control signal of the switch element S1 is constantly H, in accordance with a signal wherein H and L of the PWM signal 2 are inverted (FIG. 12 part (e)).

When each element carries out an on/off operation based on the heretofore described control signals, voltage Vout of a pulse train of positive polarity is output between the output terminal U and neutral point terminal C (hereafter referred to as between the terminals U and C). The voltage Vout is pulse width modulated, and the amplitude thereof is the voltage V1 of the direct current power supply Psp.

Next, a description will be given of an operation of the inverter circuit 2 when voltage Vout with negative polarity is output. FIG. 13 is a diagram showing the relationship between a control signal of each element and the output voltage Vout. FIG. 13 part (a) shows the temporal change of the PWM signal 1. The PWM signal 1 is constantly L in this period. The control signal of the switching element Q1 is constantly L, in accordance with the PWM signal 1 (FIG. 13 part (c)). The control signal of the switch element S2 is constantly H, in accordance with a signal wherein H and L of the PWM signal 1 are inverted (FIG. 13 part (f)).

FIG. 13 part (b) shows the PWM signal 2. The PWM signal 2 repeatedly switches between H and L. The control signal of the switching element Q2 is H or L in synchronization with the PWM signal 2 (FIG. 13 part (d)). The control signal of the switch element S1 inverts the H and L of the PWM signal 2, and is a signal to which an idle period Td is added (FIG. 13 part (e)). The idle period Td is a period for turning the two elements off together in order to prevent a short-circuiting of the switching element Q2 and switch element S1.

When each element carries out an on/off operation based on the heretofore described control signals, voltage Vout of a pulse train of negative polarity is output between the terminals U and C. The voltage Vout is pulse width modulated, and the amplitude thereof is the voltage V2 of the direct current power supply Psn.

As heretofore described, the output voltage Vout is a pulse width modulated pulse train voltage, and includes harmonic components. The harmonic components included in the output voltage Vout are eliminated in the filter circuit 3. In the same way, harmonic components included in an output current Iout of the inverter circuit 2 are eliminated in the filter circuit 3. As a result of this, the sinusoidal alternating current Vload is applied to the load 4. Also, a sinusoidal alternating current Iload flows into the load 4.

SUMMARY

However, the heretofore described inverter device is such that, due to the existence of the reactor Lf, the output current Tout is a phase lagging with respect to the output voltage Vout. That is, a region wherein the polarity of the output voltage Vout and the polarity of the output current Tout differ exists in the cycle of the output voltage Vout. Further, the inverter device is such that output voltage Vout in accordance with the PWM signals 1 and 2 cannot be obtained in this period.

FIG. 14 is a diagram for describing this kind of problem of the inverter device. FIG. 14 part (a) is a diagram showing the temporal change of the PWM signal 1 within one cycle of the output voltage Vout. Also, FIG. 14 part (b) is a diagram showing the temporal change of the PWM signal 2 within one cycle of the output voltage Vout. The PWM signal 1 is a signal that is pulse width modulated in a period from 0 degrees to 180 degrees, and at L in a period from 180 degrees to 360 degrees. Meanwhile, the PWM signal 2 is a signal that is at L in a period from 0 degrees to 180 degrees, and is pulse width modulated in a period from 180 degrees to 360 degrees. When the inverter circuit 2 operates based on the PWM signals 1 and 2, the voltage Vout shown in FIG. 14 part (c) is output.

Herein, the pulse width of the output voltage Vout is a width such that the idle period Td is added before and after the pulse of the PWM signal 1 in a period A. This is because in period A, when the switch element S2 is turned off, the current Tout flows into a diode connected in anti-parallel to the switching element Q1. Also, the pulse width of the output voltage Vout is a width such that the idle period Td is added before and after the pulse of the PWM signal 2 in a period B. This is because in period B, when the switch element S1 is turned off, the current Tout flows into a diode connected in anti-parallel to the switching element Q2. In periods A and B, the widths of pulses T1 to T4 commanded by the PWM signals 1 and 2 are small, because of which waveform distortion caused by the idle period Td increases. Therefore, voltage oscillation due to step change of the output voltage Vout occurs in the filter circuit 3. As a result of this, oscillation and waveform distortion of the load voltage Vload increases in periods A and B (FIG. 14(*d*)). In order to reduce the oscillation and waveform distortion of the load voltage Vload occurring in this way, it is necessary to increase the size of the filter circuit 3.

Embodiments of the invention have been contrived in order to resolve the problem of this kind of existing technology. That is, among the benefits of embodiments of the invention is providing an inverter device such that it is possible to output voltage wherein an increase in waveform distortion is restricted even in a period in which the polarities of the output voltage and output current differ. This is achieved by outputting an alternating current voltage obtained by synthesizing voltage input via a bidirectional switch and a pulse train voltage, generated in accordance with a PWM signal, whose amplitude corresponds to the positive voltage or negative voltage of a direct current power supply.

A first aspect of the invention for achieving the heretofore described benefits is an inverter device including a power converter formed of first and second switching elements and a bidirectional switch. Each of the first and second switching elements includes a diode connected in anti-parallel. Further, the first and second switching elements are connected in series to either end of a direct current power supply. The bidirectional switch is configured by first and second switch elements being connected in anti-series or anti-parallel, and one end thereof is connected to a connection point of the first and second switching elements. One aspect of the inverter device is configured by the other end of the bidirectional switch being connected to an intermediate potential point of the direct current power supply. Also, another aspect of the inverter device is configured by the other end of the bidirectional switch being connected to the other end of an alternating current power supply of which one end is connected to the intermediate potential point of the direct current power supply. In this aspect, the sizes of the positive voltage and negative voltage of the direct current power supply, which have the intermediate potential point as a reference, are set to be greater than the amplitude value of the voltage of the alternating current power supply. Further, the power converter configured in this way includes an operating mode wherein alternating current voltage is output using positive voltage of the direct current power supply input via the first switching element, negative voltage of the direct current power supply input via the second switching element, and voltage input via the bidirectional switch.

Further, the inverter device according to this aspect of the invention is such that, in this operating mode, the second switching element and second switch element are turned off, the first switching element is turned on and off based on a first signal (PWM signal 1) pulse width modulated in accordance with an output voltage command, and the first switch element is turned on and off based on a signal wherein an idle period is added to an inverted signal of the PWM signal 1, in a period in which the polarities of the output voltage and output current are both positive. Also, the inverter device is such that, in this operating mode, the first switching element and first switch element are turned off, the second switching element is turned on and off based on a second signal (PWM signal 2) pulse width modulated in accordance with an output voltage command, and the second switch element is turned on and off based on a signal wherein an idle period is added to an inverted signal of the PWM signal 2, in a period in which the polarities of the output voltage and output current are both negative. That is, the inverter device operates so that two elements are alternately turned on and off either side of an idle period in a period in which the polarity of the output voltage and the polarity of the output current are the same.

Meanwhile, the inverter device according to this aspect of the invention is such that, in this operating mode, the first and second switching elements are turned off, one switch element of the bidirectional switch is turned on in accordance with the polarities of the output voltage and output current, and the other switch element of the bidirectional switch is turned on and off based on an inverted signal of the PWM signal 1 or PWM signal 2, in a period in which the polarities of the output voltage and output current differ. Specifically, the inverter device is such that, in this operating mode, the first and second switching elements are turned off, the first switch element is turned on, and the second switch element is turned on and off based on an inverted signal of the PWM signal 1, in a period in which the output voltage is of positive polarity and the output current is of negative polarity. Also, the inverter device is such that, in this operating mode, the first and second switching elements are turned off, the second switch element is turned on, and the first switch element is turned on and off based on an inverted signal of the PWM signal 2, in a period in which the output voltage is of negative polarity and the output current is of positive polarity.

As heretofore described, the power converter of the inverter device according to the first aspect of the invention is such that it is possible to output alternating current voltage obtained by synthesizing voltage input via a bidirectional switch and a pulse train voltage whose amplitude corresponds to the positive voltage or negative voltage of a direct current power supply. The pulse train voltage is voltage generated in accordance with one of a PWM signal 1 or PWM signal 2. That is, the alternating current voltage output by this power converter is not affected by an idle period. Consequently, the inverter device according to this aspect of the invention is such that it is possible to restrict an increase in waveform distortion of the output voltage, without increasing the size of a filter circuit for eliminating harmonic components from the output voltage of the power converter.

A second aspect of the invention for achieving the heretofore described benefits is an inverter device including a power converter formed of first and second switching elements and first and second bidirectional switches. Each of the first and second switching elements includes a diode connected in anti-parallel. Further, the first and second switching elements are connected in series to either end of a direct current power supply. The first bidirectional switch is configured by first and second switch elements being connected in anti-series or anti-parallel. Further, the first bidirectional switch is connected between a connection point of the first and second switching elements and the other end of an alternating current power supply of which one end is connected to an intermediate potential point of the direct current power supply. The second bidirectional switch is configured by third and fourth switch elements being connected in anti-series or anti-parallel. Further, the second bidirectional switch is connected between a connection point of the first and second switching elements and the intermediate potential point of the direct current power supply. Herein, the sizes of the positive voltage and negative voltage of the direct current power supply, which have the intermediate potential point as a reference, are set to be greater than the amplitude value of the voltage of the alternating current power supply. The power converter configured in this way includes a first operating mode wherein alternating current voltage is output using positive voltage of the direct current power supply input via the first switching element, negative voltage of the direct current power supply input via the second switching element, and intermediate voltage of the direct current power supply input via the second bidirectional switch.

Further, the inverter device according to this aspect of the invention is such that, in the first operating mode, the second switching element and first bidirectional switch are turned off, the third switch element is turned on, the first switching element is turned on and off based on a first signal (PWM signal 1) pulse width modulated in accordance with an output voltage command, and the fourth switch element is turned on and off based on a signal wherein an idle period is added to an inverted signal of the PWM signal 1, in a period in which the polarities of the output voltage and output current are both positive. Also, the inverter device is such that, in the first operating mode, the first switching element and first bidirectional switch are turned off, the fourth switch element is turned on, the second switching element is turned on and off based on a second signal (PWM signal 2) pulse width modulated in accordance with an output voltage command, and the third switch element is turned on and off based on a signal wherein an idle period is added to an inverted signal of the PWM signal 2, in a period in which the polarities of the output voltage and output current are both negative. That is, the inverter device operates so that two elements are alternately turned on and off either side of an idle period in a period in which the polarity of the output voltage and the polarity of the output current are the same.

Meanwhile, the inverter device according to this aspect of the invention is such that, in the first operating mode, the first and second switching elements and first bidirectional switch are turned off, one switch element of the second bidirectional switch is turned on in accordance with the polarities of the output voltage and output current, and the other switch element of the second bidirectional switch is turned on and off based on an inverted signal of the PWM signal 1 or PWM signal 2, in a period in which the polarities of the output voltage and output current differ. Specifically, the inverter device is such that, in the first operating mode, the first and second switching elements and first bidirectional switch are turned off, the third switch element is turned on, and the fourth switch element is turned on and off based on an inverted signal of the PWM signal 1, in a period in which the output voltage is of positive polarity and the output current is of negative polarity. Also, the inverter device is such that, in the first operating mode, the first and second switching elements and first bidirectional switch are turned off, the fourth switch element is turned on, and the third switch element is turned on and off based on an inverted signal of the PWM signal 2, in a period in which the output voltage is of negative polarity and the output current is of positive polarity.

As heretofore described, the power converter of the inverter device according to the second aspect of the invention is such that it is possible to output alternating current voltage obtained by synthesizing intermediate voltage of a direct current power supply and a pulse train voltage whose amplitude corresponds to the positive voltage or negative voltage of the direct current power supply. The pulse train voltage is voltage generated in accordance with one of a PWM signal 1 or PWM signal 2. That is, the alternating current voltage output by this power converter is not affected by an idle period. Consequently, the inverter device according to this aspect of the invention is such that it is possible to restrict an increase in waveform distortion of the output voltage, without increasing the size of a filter circuit for eliminating harmonic components from the output voltage of the power converter.

A third aspect of the invention for achieving the heretofore described object is an inverter device including a power converter formed of first and second switching elements and first and second bidirectional switches. Each of the first and second switching elements includes a diode connected in anti-parallel. Further, the first and second switching elements are connected in series to either end of a direct current power supply. The first bidirectional switch is configured by first and second switch elements being connected in anti-series or anti-parallel. Further, the first bidirectional switch is connected between a connection point of the first and second switching elements and the other end of an alternating current power supply of which one end is connected to an intermediate potential point of the direct current power supply. The second bidirectional switch is configured by third and fourth switch elements being connected in anti-series or anti-parallel. Further, the second bidirectional switch is connected between a connection point of the first and second switching elements and the intermediate potential point of the direct current power supply. Herein, the sizes of the positive voltage and negative voltage of the direct current power supply, which have the intermediate potential point as a reference, are set to be greater than the amplitude value of the voltage of the alternating current power supply. The power converter configured in this way includes a second operating mode wherein alternating current voltage is output using positive voltage of the direct current power supply input via the first switching element, negative voltage of the direct current power supply input via the second switching element, and voltage of the alternating current power supply input via the first bidirectional switch.

Further, the inverter device according to this aspect of the invention is such that, in the second operating mode, the second switching element and second bidirectional switch are turned off, the first switch element is turned on, the first switching element is turned on and off based on a first signal (PWM signal 1) pulse width modulated in accordance with an output voltage command, and the second switch element is turned on and off based on a signal wherein an idle period is added to an inverted signal of the PWM signal 1, in a period in which the polarities of the output voltage and output current are both positive. Also, the inverter device is such that, in the second operating mode, the first switching element and second bidirectional switch are turned off, the second switch element is turned on, the second switching element is turned on and off based on a second signal (PWM signal 2) pulse width modulated in accordance with an output voltage command, and the first switch element is turned on and off based on a signal wherein an idle period is added to an inverted signal of the PWM signal 2, in a period in which the polarities of the output voltage and output current are both negative. That is, the inverter device operates so that two elements are alternately turned on and off either side of an idle period in a period in which the polarity of the output voltage and the polarity of the output current are the same.

Meanwhile, the inverter device according to this aspect of the invention is such that, in the second operating mode, the first and second switching elements and second bidirectional switch are turned off, one switch element of the first bidirectional switch is turned on in accordance with the polarities of the output voltage and output current, and the other switch element of the first bidirectional switch is turned on and off based on an inverted signal of the PWM signal 1 or PWM signal 2, in a period in which the polarities of the output voltage and output current differ. Specifically, the inverter device is such that, in the second operating mode, the first and second switching elements and second bidirectional switch are turned off, the first switch element is turned on, and the second switch element is turned on and off based on an inverted signal of the PWM signal 1, in a period in which the output voltage is of positive polarity and the output current is of negative polarity. Also, the inverter device is such that, in the second operating mode, the first and second switching elements and second bidirectional switch are turned off, the second switch element is turned on, and the first switch element is turned on and off based on an inverted signal of the PWM signal 2, in a period in which the output voltage is of negative polarity and the output current is of positive polarity.

As heretofore described, the power converter of the inverter device according to the third aspect of the invention is such that it is possible to output alternating current voltage obtained by synthesizing voltage of an alternating current power supply and a pulse train voltage whose amplitude corresponds to the positive voltage or negative voltage of the direct current power supply. The pulse train voltage is voltage generated in accordance with one of a PWM signal 1 or PWM signal 2. That is, the alternating current voltage output by this power converter is not affected by an idle period. Consequently, the inverter device according to this aspect of the invention is such that it is possible to restrict an increase in waveform distortion of the output voltage, without increasing the size of a filter circuit for eliminating harmonic components from the output voltage of the power converter.

An inverter device according to embodiments of the invention makes it possible to output alternating current voltage obtained by synthesizing voltage input via a bidirectional switch and a pulse train voltage, generated in accordance with a PWM signal, whose amplitude corresponds to the positive voltage or negative voltage of a direct current power supply.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Figure 1:
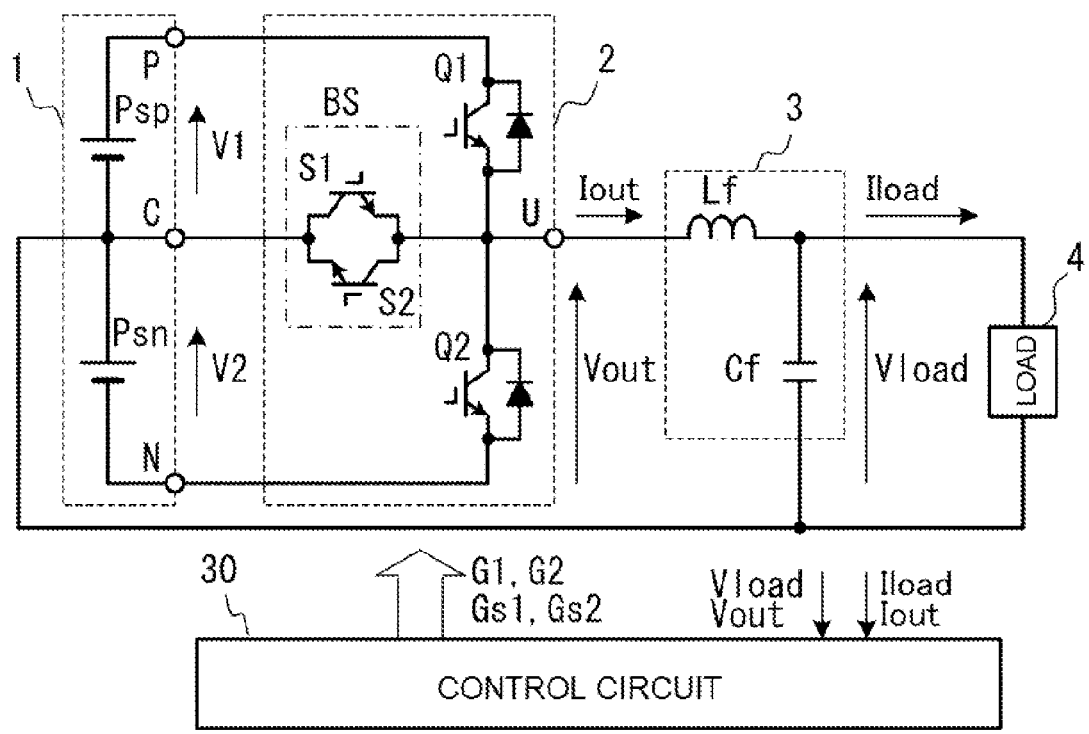
FIG. 1 is a diagram for describing a configuration of an inverter device to which the invention is applied.

Reference will now be made in detail to the embodiments, examples of which are illustrated in the accompanying drawings, wherein like reference numerals refer to the like elements throughout. The embodiments are described below to explain the present invention by referring to the figures.

Figure 11:
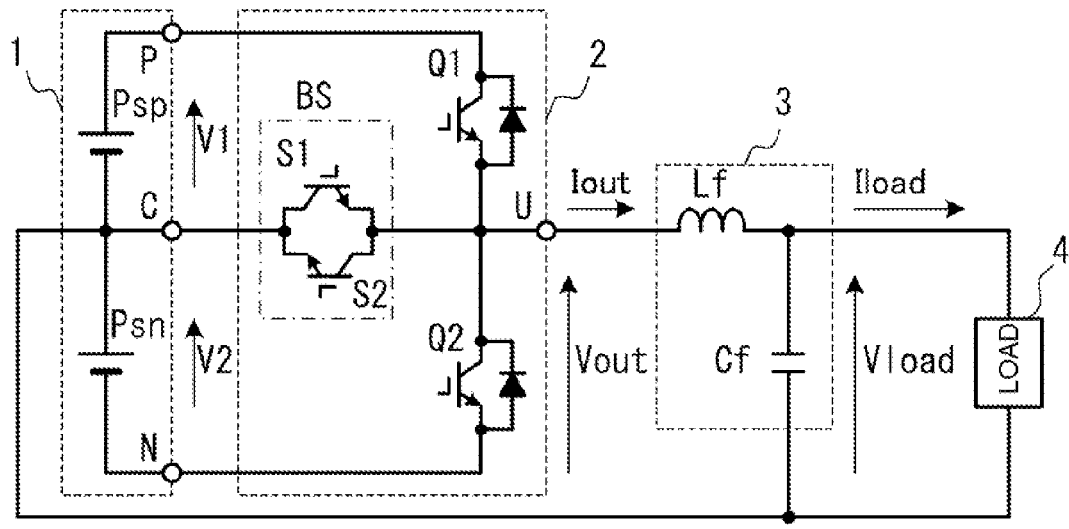
FIG. 11 is a diagram for describing the configuration of an inverter device according to existing technology.

A description will be given, using FIG. 1 to FIG. 6, of a first embodiment of an inverter device according to the invention. FIG. 1 shows an inverter device such that a control circuit 30 is added to the inverter device shown in FIG. 11. Consequently, circuit configurations other than the control circuit 30 are the same as in the inverter device shown in FIG. 11, because of which a description thereof will be omitted.

Figure 2A:
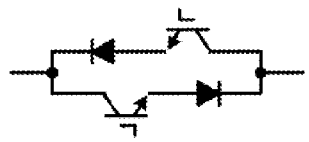
FIGS. 2A-2C are diagrams for describing other embodiments of a bidirectional switch shown in FIG. 1.
Figure 2B:
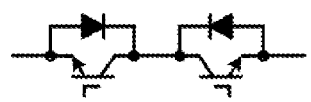
Figure 2C:
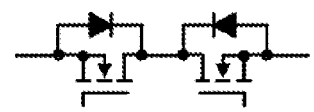

A bidirectional switch BS may be a circuit formed of a configuration shown in FIGS. 2A-2C, or a circuit having equivalent functions and effects. This also applies to other embodiments of the invention. FIG. 2A is a bidirectional switch configured by two circuits wherein an IGBT (Insulated Gate Bipolar Transistor) and diode are connected in series being connected in anti-parallel. FIG. 2A is a bidirectional switch configured by two IGBTs, to each of which a diode is connected in anti-parallel, being connected in anti-series. FIG. 2C is a bidirectional switch configured by the IGBTs being replaced with MOSFETs (Metal Oxide Semiconductor Field Effect Transistors) in FIG. 2B.

Figure 3:
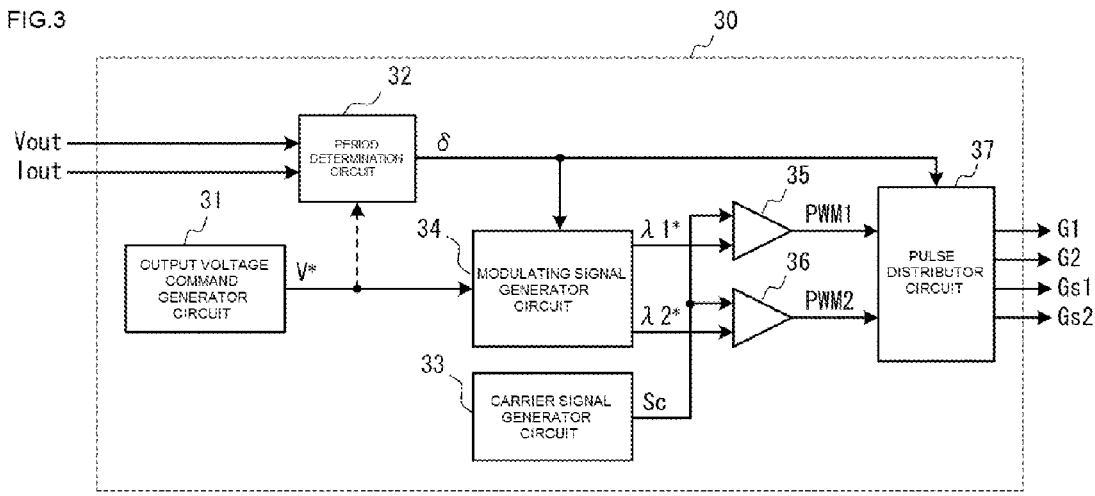
FIG. 3 is a diagram for describing the configuration of a control circuit shown in FIG. 1.

FIG. 3 is a diagram showing the configuration of the control circuit 30. The control circuit 30 includes an output voltage command generator circuit 31, a period determination circuit 32, a carrier signal generator circuit 33, a modulating signal generator circuit 34, pulse width modulation circuits 35 and 36, and a pulse distributor circuit 37. Further, an outline of an operation of the control circuit 30 is as follows.

The output voltage command generator circuit 31 outputs a command (output voltage command V*) for voltage output by the inverter circuit 2. The period determination circuit 32 generates a period signal δ that has determined between periods A to C using the output voltage Vout and output current Tout. Period A is a period in which the output voltage Vout is of positive polarity, and the output current Tout is of negative polarity. Period B is a period in which the output voltage Vout is of negative polarity, and the output current Tout is of positive polarity. Period C is a period in which the output voltage Vout and output current Tout are of the same polarity. The period signal δ may be generated using the output voltage command V* instead of the output voltage Vout.

The carrier signal generator circuit 33 generates a carrier signal Sc of a predetermined frequency. The modulating signal generator circuit 34, based on the output voltage command V* and period signal δ, generates a first modulating signal λ1* and a second modulating signal λ2*. The pulse width modulation circuit 35, using the first modulating signal λ1* and carrier signal Sc, generates a pulse width modulated first signal (PWM signal 1). The pulse width modulation circuit 36, using the second modulating signal λ2* and carrier signal Sc, generates a pulse width modulated second signal (PWM signal 2). The pulse distributor circuit 37, using the PWM signal 1, PWM signal 2, and period signal δ, generates control signals G1, G2, Gs1, and Gs2 of the switching elements Q1 and Q2 and switch elements S1 and S2.

By the inverter circuit 2 operating based on the heretofore described control signals, pulse width modulated pulse train voltage Vout is output between the terminals U and C.

Figure 12:
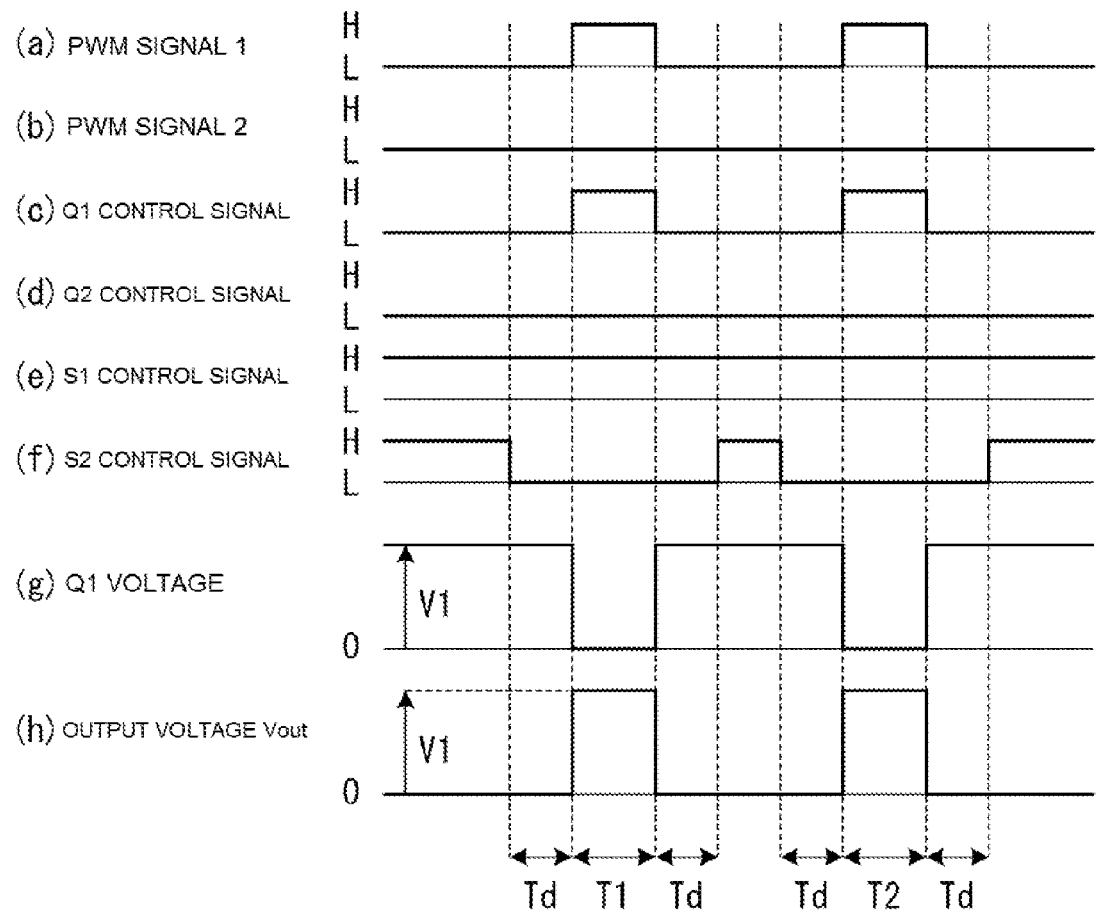
FIG. 12 is a diagram for describing operations of an inverter device when outputting voltage of a positive polarity.

Firstly, using FIG. 4, a description will be given of operations of the control circuit 30 and inverter circuit 2 in period A. When the period signal δ indicates period A, the control circuit 30 generates the PWM signal 1, which repeatedly switches between H and L (FIG. 4 part (a)). The PWM signal 1 is the same signal as the PWM signal 1 shown in FIG. 12 part (a). In the drawing, a first pulse width at which the PWM signal 1 becomes H is T1, while a second pulse width is T2. Also, the control circuit 30 generates the PWM signal 2, which is constantly L (FIG. 4 part (b)). The PWM signal 2 is the same signal as the PWM signal 2 shown in FIG. 12 part (b)

Further, the control circuit 30, based on the PWM signals 1 and 2, generates the control signal of each element configuring the inverter circuit 2. Specifically, in period A, the control circuit 30 constantly controls the control signals G1 and G2 of the switching elements Q1 and Q2 respectively to L (FIG. 4 parts (c) and (d)). Also, the control circuit 30 constantly controls the control signal Gs1 of the switch element S1 to H (FIG. 4 part (e)). Further, the control circuit 30 controls the control signal Gs2 of the switch element S2 to a signal such that H and L of the PWM signal 1 are inverted (FIG. 4 part (f)). As the switching element Q1 is constantly in an off state in this period, the control circuit 30 does not add the idle period Td to the control signal Gs2.

Figure 4:
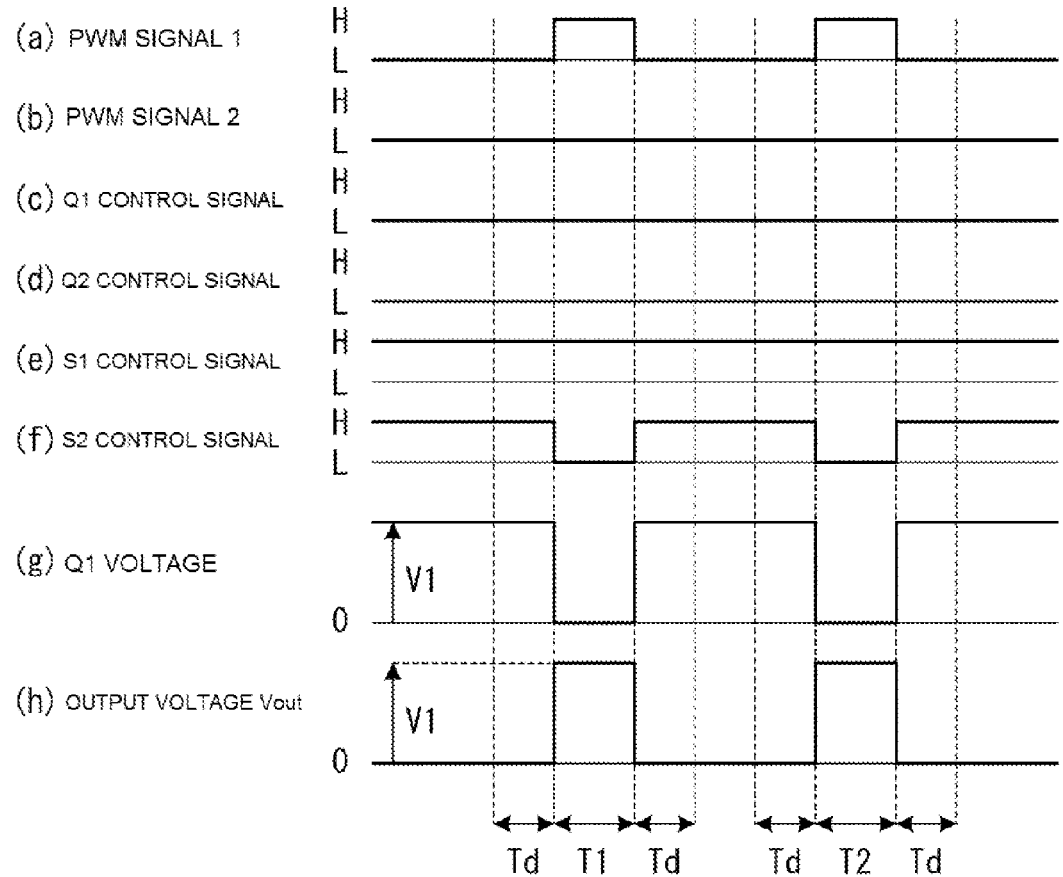
FIG. 4 is a diagram for describing operations in a period A of the inverter device shown in FIG. 1

When the inverter circuit 2 operates based on the heretofore described control signals, alternating current voltage Vout obtained by synthesizing voltage (zero voltage Vz) input via the bidirectional switch BS and a pulse train voltage, generated in accordance with the PWM signal 1, whose amplitude corresponds to the positive voltage of the direct current power supply 1 is output between the terminals U and C (FIG. 4 part (h)). For example, when the PWM signal 1 is L, the control signal Gs2 is H, because of which the switch element S2 is turned on. Consequently, the output current Tout of the inverter circuit 2 flows from the output terminal U toward the neutral point terminal C via the switch element S2. At this time, the voltage V1 of the direct current power supply Psp is applied to the switching element Q1 (FIG. 4 part (g)). Further, the voltage (zero voltage Vz) of the neutral point terminal C is output to the output terminal U (FIG. 4 part (h)). Also, when the PWM signal 1 is H, the control signal Gs2 is L, because of which the switch element S2 is turned off. Consequently, the output current Tout of the inverter circuit 2 flows from the output terminal U toward the positive side terminal P via the anti-parallel diode of the switching element Q1. At this time, forward voltage of the anti-parallel diode is applied to the switching element Q1 (FIG. 4 part (g)). Further, the voltage V1 of the direct current power supply Psp is output between the terminals U and C (FIG. 4 part (h)).

Figure 13:
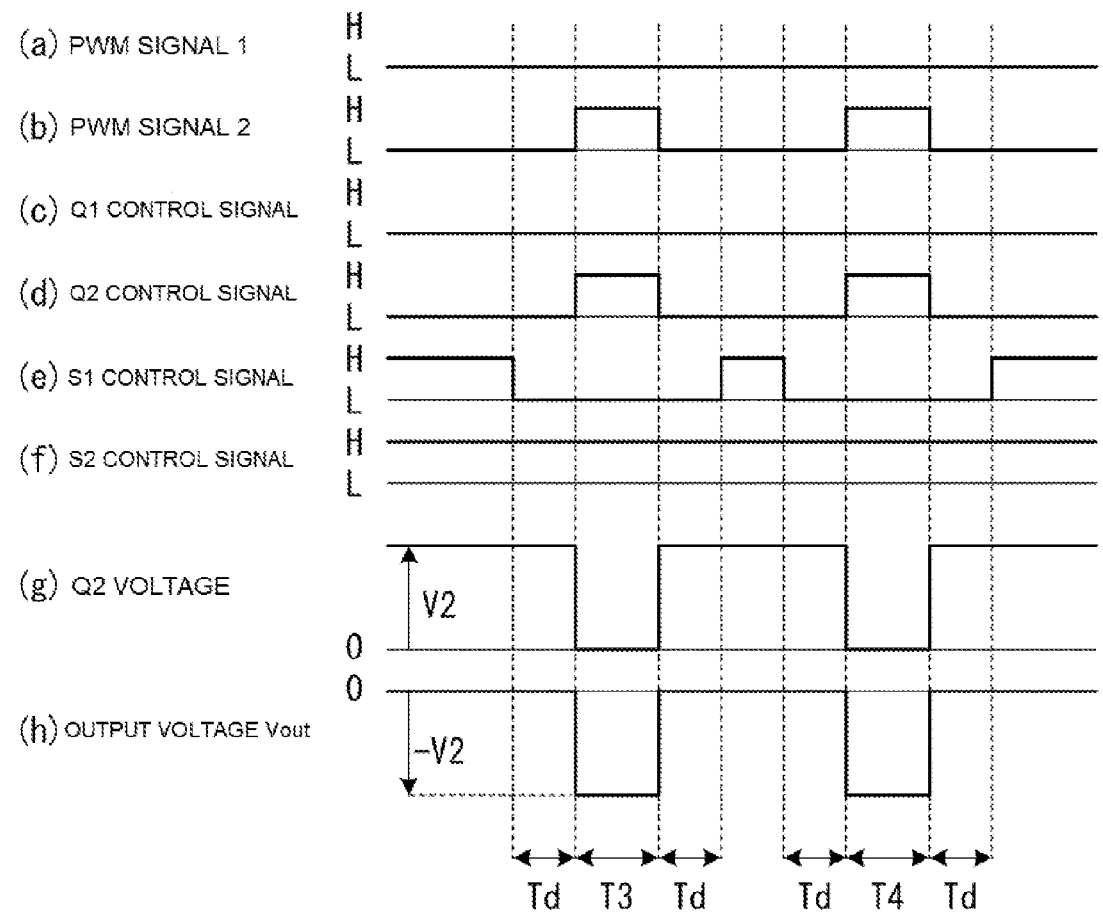
FIG. 13 is a diagram for describing operations of an inverter device when outputting voltage of a negative polarity.
Figure 14:
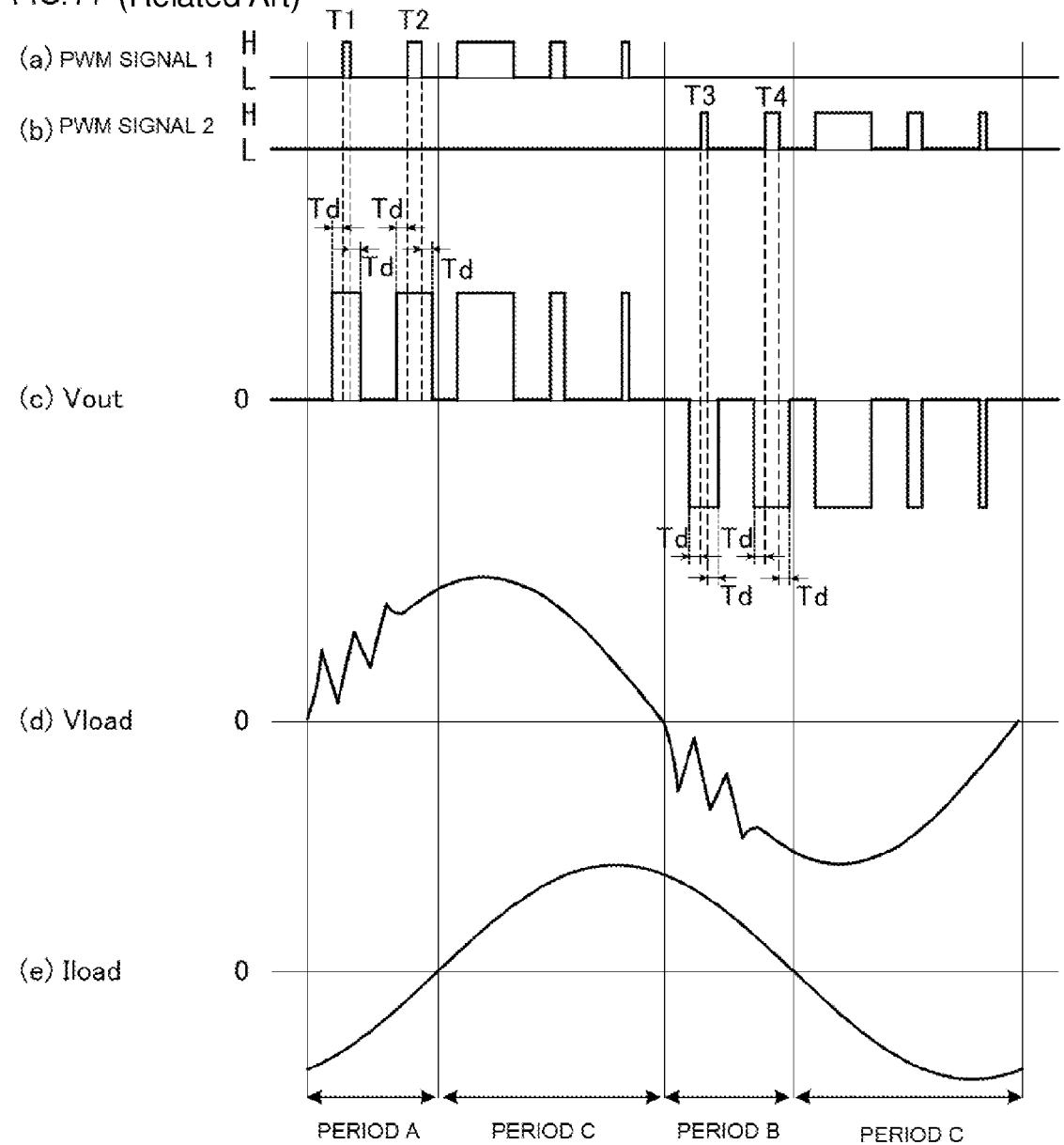
FIG. 14 is a diagram for describing the relationship between output voltage and output current when there is a lagging power factor.

Next, using FIG. 5, a description will be given of operations of the control circuit 30 and inverter circuit 2 in period B. When the period signal δ indicates period B, the control circuit 30 generates the PWM signal 1, which is constantly L (FIG. 5 part (a)). The PWM signal 2 is the same signal as the PWM signal 1 shown in FIG. 13 part (a). Also, the control circuit 30 generates the PWM signal 2, which repeatedly switches between H and L (FIG. 5 part (b)). The PWM signal 2 is the same signal as the PWM signal 2 shown in FIG. 13 part (b). In the drawing, a first pulse width at which the PWM signal 2 becomes H is T3, while a second pulse width is T4.

Further, the control circuit 30, based on the PWM signals 1 and 2, generates the control signal of each element configuring the inverter circuit 2. Specifically, in period B, the control circuit 30 constantly controls the control signals G1 and G2 of the switching elements Q1 and Q2 respectively to L (FIG. 5 parts (c) and (d)). Also, the control circuit 30 constantly controls the control signal Gs2 of the switch element S2 to H (FIG. 5 part (f)). Further, the control circuit 30 controls the control signal Gs1 of the switch element S1 to a signal such that H and L of the PWM signal 2 are inverted (FIG. 5 part (e)). As the switching element Q2 is constantly in an off state in this period, the control circuit 30 does not add the idle period Td to the control signal Gs1.

Figure 5:
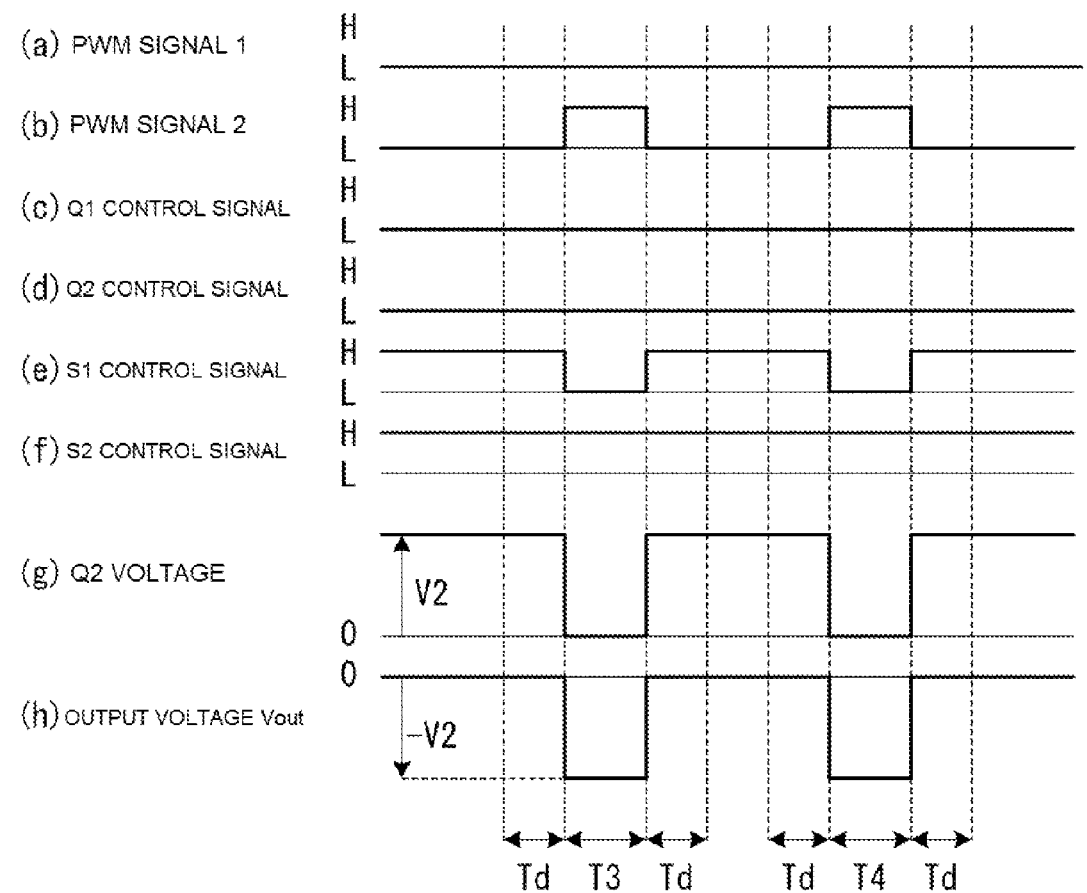
FIG. 5 is a diagram for describing operations in a period B of the inverter device shown in FIG. 1.

When the inverter circuit 2 operates based on the heretofore described control signals, alternating current voltage Vout obtained by synthesizing voltage (zero voltage Vz) input via the bidirectional switch BS and a pulse train voltage, generated in accordance with the PWM signal 2, whose amplitude corresponds to the negative voltage of the direct current power supply 1 is output between the terminals U and C (FIG. 5 part (h)). For example, when the PWM signal 2 is L, the control signal Gs1 is H, because of which the switch element S1 is turned on. Consequently, the output current Tout of the inverter circuit 2 flows from the neutral point terminal C toward the output terminal U via the switch element S1. At this time, the voltage V2 of the direct current power supply Psn is applied to the switching element Q2 (FIG. 5 part (g)). Further, the voltage (zero voltage Vz) of the neutral point terminal C is output to the output terminal U (FIG. 5 part (h)). Also, when the PWM signal 2 is H, the control signal Gs1 is L, because of which the switch element S1 is turned off. Consequently, the output current Tout of the inverter circuit 2 flows from the negative side terminal N toward the output terminal U via the anti-parallel diode of the switching element Q2. At this time, forward voltage of the anti-parallel diode is applied to the switching element Q2 (FIG. 5 part (g)). Further, the voltage V2 of the direct current power supply Psn is output at negative polarity to the output terminal U (FIG. 5 part (h)).

In period C, the control circuit 30 adds the idle period Td to the control signals of the switch elements S1 and S2. However, as the polarities of the output voltage Vout and output current Tout are the same in period C, the output voltage Vout, not being affected by the idle period Td, is a voltage in accordance with the PWM signals 1 and 2.

Figure 6:
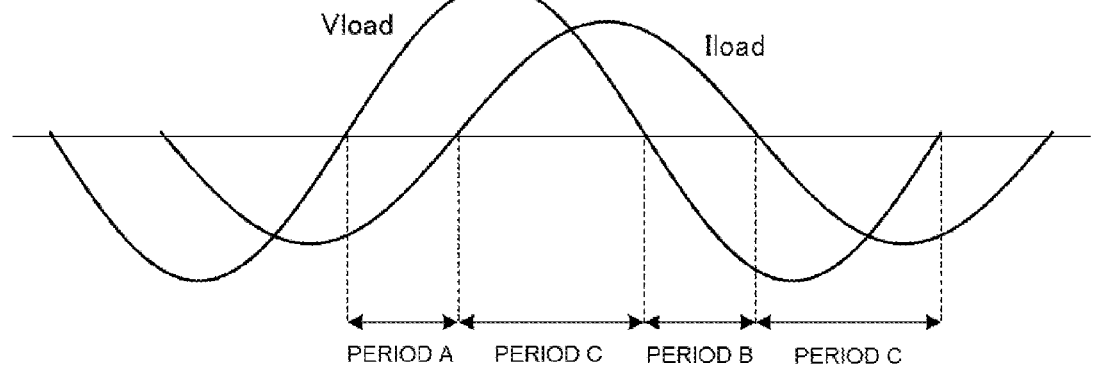
FIG. 6 is a diagram for describing the relationship between output voltage and output current when there is a lagging power factor.

As heretofore described, the inverter device according to the embodiment is such that, in periods A to C, it is possible to output the alternating current voltage Vout obtained by synthesizing voltage input via the bidirectional switch BS and a pulse train voltage whose amplitude corresponds to the positive voltage or negative voltage of the direct current power supply 1. Further, the pulse train voltage is voltage generated in accordance with the PWM signals 1 and 2. That is, the alternating current voltage Vout output by this power converter is not affected by the idle period Td. Consequently, the inverter device is such that it is possible to restrict an increase in waveform distortion of the load voltage Vload, without increasing the size of the filter circuit for eliminating harmonic components from the output voltage Vout of the power converter. Further, the load voltage Vload and a load current Iload have sinusoidal waveforms, as shown in FIG. 6.

Figure 7:
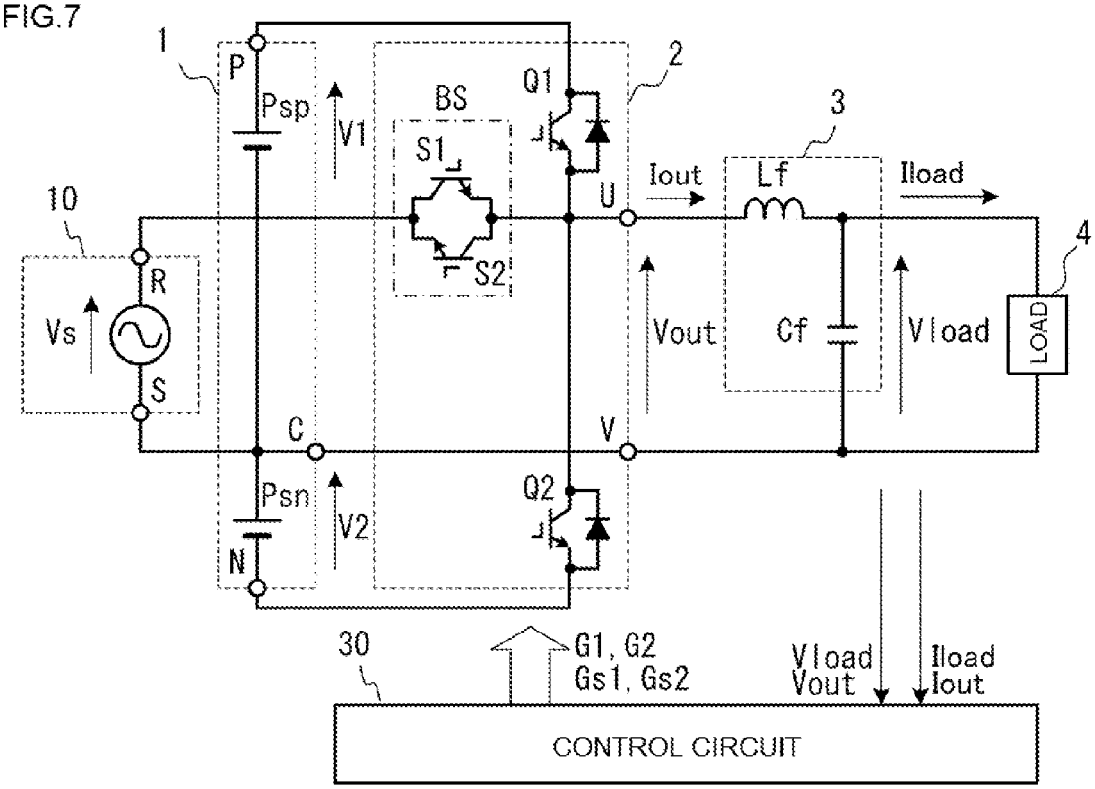
FIG. 7 is a diagram for describing another configuration of an inverter device to which the invention is applied.

Next, a description will be given, using FIG. 7 to FIG. 9, of a second embodiment of the inverter device according to the invention. FIG. 7 shows an inverter device such that an alternating current power supply 10 is added to the inverter device shown in FIG. 1. The configurations of the direct current power supply 1, inverter circuit 2, filter circuit 3, load 4, and control circuit 30 are the same as in the first embodiment, because of which a description thereof will be omitted.

A terminal S of the alternating current power supply 10 is connected to the neutral point terminal C. A terminal R of the alternating current power supply 10 is connected to the other end of the bidirectional switch BS, which is formed of the switch elements S1 and S2 and of which one end is connected to the output terminal U. Herein, the sizes of the positive voltage and negative voltage of the direct current power supply, which have an intermediate potential point as a reference, are set to be greater than the amplitude value of the voltage of the alternating current power supply. Further, the output voltage of the inverter circuit 2 is output between the output terminal U and an output terminal V connected to the neutral point terminal C (hereafter referred to as between the terminals U and V).

The control circuit 30 generates a period signal δ that has determined between periods A to C using the output voltage Vout and output current Tout, in the same way as in the first embodiment. The period signal δ may be generated using the output voltage command V* instead of the output voltage Vout. Also, the control circuit 30 generates the pulse width modulated PWM signals 1 and 2 based on the output voltage command V*. Furthermore, the control circuit 30, based on the period signal δ and PWM signals 1 and 2, generates the control signal of each element configuring the inverter circuit 2.

Firstly, using FIG. 8, a description will be given of operations of the control circuit 30 and inverter circuit 2 in period A. When the period signal δ indicates period A, the control circuit 30 generates the PWM signal 1, which repeatedly switches between H and L (FIG. 8 part (a)). The PWM signal 1 is a signal corresponding to the PWM signal 1 shown in FIG. 12 part (a). In the drawing, a first pulse width at which the PWM signal 1 becomes H is T1, while a second pulse width is T2. Also, the control circuit 30 generates the PWM signal 2, which is constantly L (FIG. 8 part (b)). The PWM signal 2 is a signal corresponding to the PWM signal 2 shown in FIG. 12 part (b).

Further, the control circuit 30, based on the PWM signals 1 and 2, generates the control signal of each element configuring the inverter circuit 2. Specifically, in period A, the control circuit 30 constantly controls the control signals G1 and G2 of the switching elements Q1 and Q2 respectively to L (FIG. 8 parts (c) and (d)). Also, the control circuit 30 constantly controls the control signal Gs1 of the switch element S1 to H (FIG. 8 part (e)). Further, the control circuit 30 controls the control signal Gs2 of the switch element S2 to a signal such that H and L of the PWM signal 1 are inverted (FIG. 8 part (f)). As the switching element Q1 is constantly in an off state in this period, the control circuit 30 does not add the idle period Td to the control signal Gs2.

Figure 8:
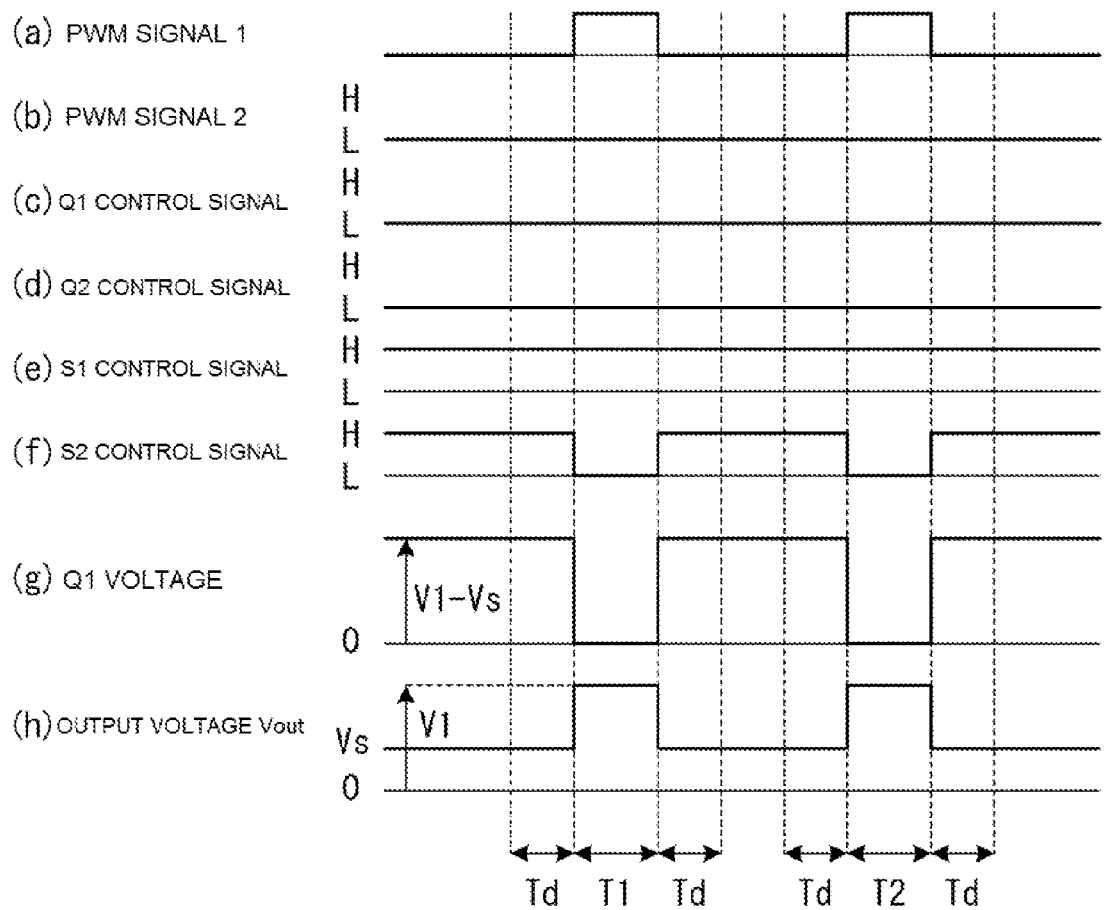
FIG. 8 is a diagram for describing operations in a period A of the inverter device shown in FIG. 7.

When the inverter circuit 2 operates based on the heretofore described control signals, voltage Vout obtained by synthesizing voltage Vs of the alternating current power supply 10 and a pulse train voltage, generated in accordance with the PWM signal 1, whose amplitude corresponds to the positive voltage or negative voltage of the direct current power supply 1 is output between the terminals U and V (FIG. 8 part (h)). For example, when the PWM signal 1 is L, the control signal Gs2 is H, because of which the switch element S2 is turned on. Consequently, the output current Tout of the inverter circuit 2 flows from the output terminal U toward the terminal R of the alternating current power supply 10 via the switch element S2. At this time, voltage equivalent to the difference between the voltage V1 of the direct current power supply Psp and the voltage Vs of the alternating current power supply 10 is applied to the switching element Q1 (FIG. 8 part (g)). Further, the voltage Vs of the terminal R is output to the output terminal U (FIG. 8 part (h)). Also, when the PWM signal 1 is H, the control signal Gs2 is L, because of which the switch element S2 is turned off. Consequently, the output current Tout of the inverter circuit 2 flows from the output terminal U toward the positive side terminal P via the anti-parallel diode of the switching element Q1. At this time, forward voltage of the anti-parallel diode is applied to the switching element Q1 (FIG. 8 part (g)). Further, the voltage V1 of the direct current power supply Psp is output between the terminals U and V (FIG. 8 part(h)).

Next, using FIG. 9, a description will be given of operations of the control circuit 30 and inverter circuit 2 in period B. When the period signal δ indicates period B, the control circuit 30 generates the PWM signal 1, which is constantly L (FIG. 9 part (a)). The PWM signal 2 is a signal corresponding to the PWM signal 1 shown in FIG. 13 part (a). Also, the control circuit 30 generates the PWM signal 2, which repeatedly switches between H and L (FIG. 9 part (b)). The PWM signal 2 is a signal corresponding to the PWM signal 2 shown in FIG. 13 part (b). In the drawing, a first pulse width at which the PWM signal 2 becomes H is T3, while a second pulse width is T4.

Further, the control circuit 30, based on the PWM signals 1 and 2, generates the control signal of each element configuring the inverter circuit 2. Specifically, in period B, the control circuit 30 constantly controls the control signals G1 and G2 of the switching elements Q1 and Q2 respectively to L (FIG. 9 parts (c) and (d)). Also, the control circuit 30 constantly controls the control signal Gs2 of the switch element S2 to H (FIG. 9 part (f)). Further, the control circuit 30 controls the control signal Gs1 of the switch element S1 to a signal such that H and L of the PWM signal 2 are inverted (FIG. 9 part (e)). As the switching element Q2 is constantly in an off state in this period, the control circuit 30 does not add the idle period Td to the control signal Gs1.

Figure 9:
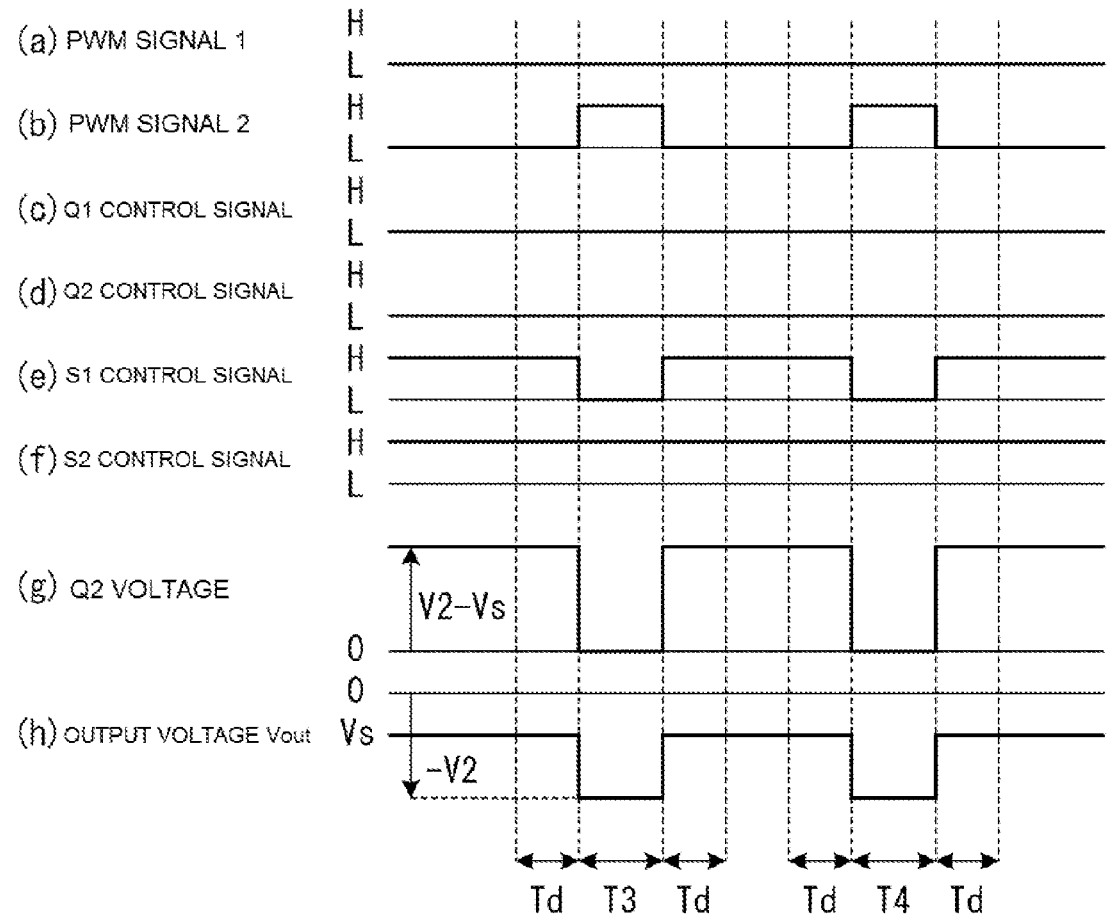
FIG. 9 is a diagram for describing operations in a period B of the inverter device shown in FIG. 7.

When the inverter circuit 2 operates based on the heretofore described control signals, voltage Vout obtained by synthesizing the voltage Vs of the alternating current power supply 10 and a pulse train voltage in accordance with the PWM signal 1 is output between the terminals U and V (FIG. 9 part (h)). For example, when the PWM signal 2 is L, the control signal Gs1 is H, because of which the switch element S1 is turned on. Consequently, the output current Tout of the inverter circuit 2 flows from the terminal R of the alternating current power supply 10 toward the output terminal U via the switch element S1. At this time, voltage equivalent to the difference between the voltage V2 of the direct current power supply Psn and the voltage Vs of the terminal R is applied to the switching element Q2 (FIG. 9 part (g)). Further, the voltage Vs of the terminal R is output to the output terminal U (FIG. 9 part (h)). Also, when the PWM signal 2 is H, the control signal Gs1 is L, because of which the switch element S1 is turned off. Consequently, the output current Tout of the inverter circuit 2 flows from the negative side terminal N toward the output terminal U via the anti-parallel diode of the switching element Q2. At this time, forward voltage of the anti-parallel diode is applied to the switching element Q2 (FIG. 9 part (g)). Further, the voltage V2 of the direct current power supply Psn is output at negative polarity to the output terminal U (FIG. 9 part (h)).

In period C, the control circuit 30 adds the idle period Td to the control signals of the switch elements S1 and S2. However, as the polarities of the output voltage Vout and output current Tout are the same in period C, the output voltage Vout, not being affected by the idle period Td, is a voltage obtained by synthesizing the voltage Vs of the alternating current power supply 10 and a pulse train voltage in accordance with the PWM signals 1 and 2.

As heretofore described, the inverter device according to the embodiment is such that, in periods A to C, it is possible to output the alternating current voltage Vout obtained by synthesizing the voltage Vs of the alternating current power supply 10 and a pulse train voltage whose amplitude corresponds to the positive voltage or negative voltage of the direct current power supply 1. Further, the pulse train voltage is voltage generated in accordance with the PWM signals 1 and 2. That is, the alternating current voltage Vout output by this power converter is not affected by the idle period Td. Consequently, the inverter device according to this embodiment is such that it is possible to restrict an increase in waveform distortion of the load voltage Vload in periods A and B, without increasing the size of the filter circuit 3. Further, the load voltage Vload and load current Iload have sinusoidal waveforms, as shown in FIG. 6.

Figure 10:
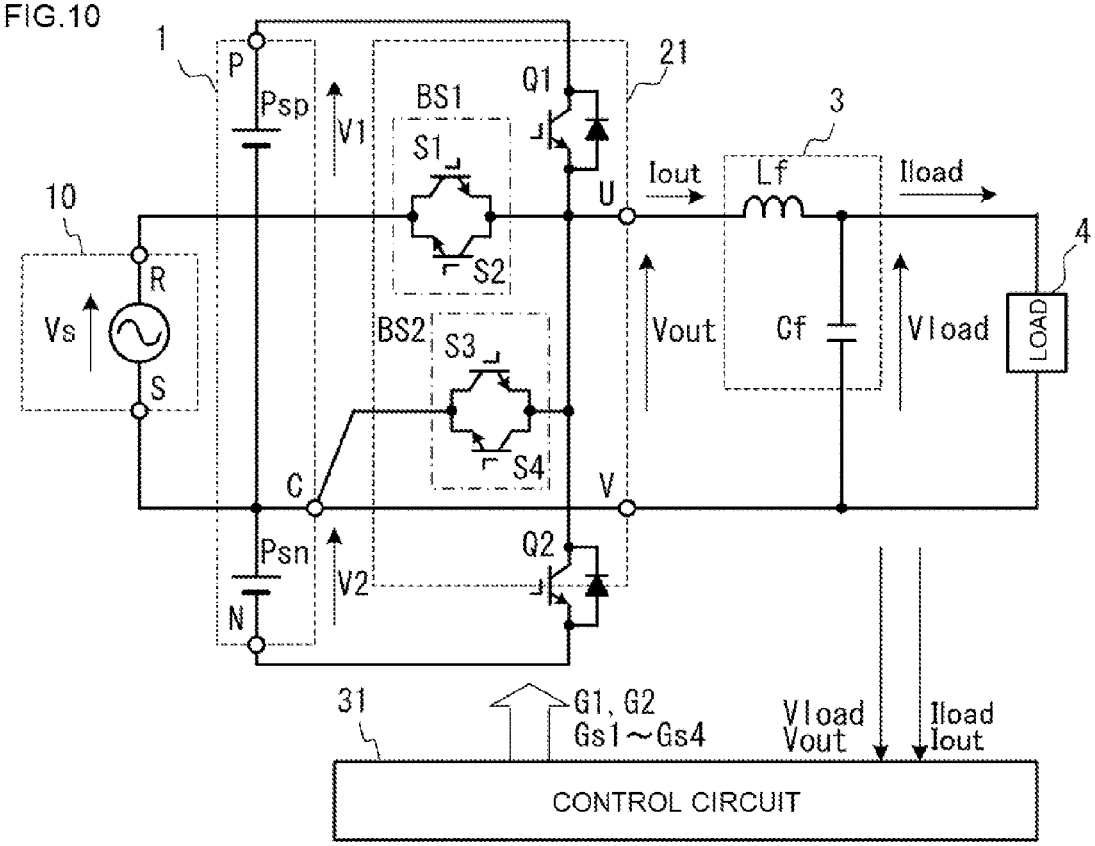
FIG. 10 is a diagram for describing another configuration of an inverter device to which the invention is applied.

Next, a description will be given, using FIG. 10, of a third embodiment of the inverter device according to the invention. The inverter device according to this embodiment employs a configuration wherein the inverter devices according to the first and second embodiments are combined. As the configurations of the direct current power supply 1, filter circuit 3, and load 4 are the same as in the first embodiment, a description thereof will be omitted. Also, a control circuit 31, having a configuration the same as that of the control circuit 30 described in the first embodiment, generates control signals G1 and G2 of switching elements Q1 and Q2, and control signals Gs1 to Gs4 of switch elements S1 to S4. Operations of the control circuit 31 will be clarified in the following description.

An inverter circuit 21 according to this embodiment is formed of the switching elements Q1 and Q2, the bidirectional switch BS1 (first bidirectional switch), and a bidirectional switch BS2 (second bidirectional switch). The switching elements Q1 and Q2 are connected in series, and connected to both ends of the direct current power supply 1. A connection point of the switching elements Q1 and Q2 is the output terminal U that outputs alternating current voltage.

The bidirectional switch BS1 is configured by the switch elements S1 and S2 being connected in anti-parallel. The bidirectional switch BS2 is configured by the switch elements S3 and S4 being connected in anti-parallel. One end of each of the bidirectional switches BS1 and BS2 is connected to the output terminal U. Further, the other end of the bidirectional switch BS1 is connected to the terminal R of the alternating current power supply 10, of which the terminal S is connected to the neutral point terminal C of the direct current power supply 1. Also, the other end of the bidirectional switch BS2 is connected to the neutral point terminal C.

The inverter device according to this embodiment has at least an operating mode 1 (first operating mode) and an operating mode 2 (second operating mode). Operating mode 1 is an operating mode wherein alternating current voltage is output using the voltages V1 and V2 of the direct current power supply 1 and an intermediate voltage. Operating mode 2 is an operating mode wherein alternating current voltage is output using the voltages V1 and V2 of the direct current power supply 1 and the voltage Vs of the alternating current power supply 10. Further, when the inverter device operates in operating mode 1, the inverter device carries out the same operations as the inverter device according to the first embodiment. Also, when the inverter device operates in operating mode 2, the inverter device carries out the same operations as the inverter device according to the second embodiment.

Specifically, when the inverter device operates in operating mode 1, the control circuit 31 generates a period signal δ that has determined between periods A to C using the output voltage Vout or output voltage command V* and the output current Tout, in the same way as the control circuit 30 according to the first embodiment. Also, the control circuit 31 generates the pulse width modulated PWM signals 1 and 2 based on the output voltage command V*. Furthermore, the control circuit 31, based on the period signal δ and PWM signals 1 and 2, generates the control signal of each element configuring the inverter circuit 21. That is, in the case of operating mode 1, the control circuit 31 constantly controls the control signals of the switch elements S1 and S2 configuring the bidirectional switch BS1 to L. Also, the control circuit 31 generates the control signals of the switching elements Q1 and Q2, and the switch elements S3 and S4 configuring the bidirectional switch BS2, with the same logic as in the cases of periods A and B of the first embodiment.

Further, by the inverter circuit 21 operating in period A based on the control signals generated in this way, voltage Vout obtained by synthesizing the intermediate voltage (zero voltage Vz) of the direct current power supply 1 and a pulse train voltage, generated in accordance with the PWM signal 1, whose amplitude corresponds to the positive voltage or negative voltage of the direct current power supply 1 is output between the terminals U and V, in the same way as in the case of period A in the first embodiment. Also, by the inverter circuit 21 operating in period B based on the control signals generated in the way heretofore described, voltage Vout obtained by synthesizing the intermediate voltage (zero voltage Vz) of the direct current power supply 1 and a pulse train voltage, generated in accordance with the PWM signal 2, whose amplitude corresponds to the negative voltage of the direct current power supply 1 is output between the terminals U and V, in the same way as in the case of period B in the first embodiment.

In period C, the control circuit 31 adds the idle period Td to the control signals of the switch elements S3 and S4. However, as the polarities of the output voltage Vout and output current Tout are the same in period C, the output voltage Vout is not affected by the idle period Td.

That is, the inverter device according to this embodiment is such that, in periods A to C in operating mode 1, it is possible to output the alternating current voltage Vout obtained by synthesizing the intermediate voltage (zero voltage Vz) of the direct current power supply 1 and a pulse train voltage whose amplitude corresponds to the positive voltage or negative voltage of the direct current power supply 1. Further, the pulse train voltage is voltage generated in accordance with the PWM signals 1 and 2. That is, the alternating current voltage Vout output by this power converter is not affected by the idle period Td. Consequently, the inverter device is such that it is possible to restrict an increase in waveform distortion of the load voltage Vload in periods A and B, without increasing the size of the filter circuit 3. Further, the load voltage Vload and load current Iload have sinusoidal waveforms, as shown in FIG. 6.

Next, when the inverter device operates in operating mode 2, the control circuit 31 generates a period signal δ that has determined between periods A to C using the output voltage Vload or output voltage command V* of the inverter device and the output current Iload, in the same way as the control circuit 30 according to the second embodiment. Also, the control circuit 31 generates the pulse width modulated PWM signals 1 and 2 based on the output voltage command V*. Furthermore, the control circuit 31, based on the period signal δ and PWM signals 1 and 2, generates the control signal of each element configuring the inverter circuit 21. That is, in the case of operating mode 2, the control circuit 31 constantly controls the control signals of the switch elements S3 and S4 configuring the bidirectional switch BS2 to L. Also, the control circuit 31 generates the control signals of the switching elements Q1 and Q2, and the switch elements S1 and S2 configuring the bidirectional switch BS1, with the same logic as in the cases of periods A and B of the second embodiment.

Further, by the inverter circuit 21 operating in period A based on the control signals generated in this way, voltage Vout obtained by synthesizing the voltage Vs of the alternating current power supply 10 and a pulse train voltage in accordance with the PWM signal 1 is output between the terminals U and V, in the same way as in the case of period A in the second embodiment. Also, by the inverter circuit 21 operating in period B based on the control signals generated in the way heretofore described, voltage Vout obtained by synthesizing the voltage Vs of the alternating current power supply 10 and a pulse train voltage in accordance with the PWM signal 1 is output between the terminals U and V, in the same way as in the case of period B in the second embodiment.

In period C, the control circuit 31 adds the idle period Td to the control signals of the switch elements S1 and S2. However, as the polarities of the output voltage Vout and output current Tout are the same in period C, the output voltage Vout is not affected by the idle period Td.

That is, the inverter device according to this embodiment is such that, in periods A to C in operating mode 2, it is possible to output the alternating current voltage Vout obtained by synthesizing the voltage Vs of the alternating current power supply 10 and a pulse train voltage whose amplitude corresponds to the positive voltage or negative voltage of the direct current power supply 1. Further, the pulse train voltage is voltage generated in accordance with the PWM signals 1 and 2. That is, the alternating current voltage Vout output by this power converter is not affected by the idle period Td. Consequently, the inverter device is such that it is possible to restrict an increase in waveform distortion of the load voltage Vload in periods A and B, without increasing the size of the filter circuit 3. Further, the load voltage Vload and load current Iload have sinusoidal waveforms, as shown in FIG. 6.

Embodiments of the invention are applicable to a power conversion device that supplies alternating current voltage to a load, such as a momentary voltage drop compensation device or uninterruptible power supply device.

Reference numerals and signs are as follows:
1 Alternating current power supply
2, 21 Inverter circuit
3 Filter circuit
4 Load
10 Alternating current power supply
30, 31 Control circuit Although a few embodiments have been shown and described, it would be appreciated by those skilled in the art that changes may be made in these embodiments without departing from the principles and spirit of the invention, the scope of which is defined in the claims and their equivalents.

What is claimed is:

1. A power converter, comprising:
   first and second switching elements, to each of which a diode is connected in anti-parallel, connected in series to either end of a direct current power supply; and
   a bidirectional switch, configured by first and second switch elements being connected in anti-series or anti-parallel, of which one end is connected to a connection point of the first and second switching elements, wherein,
   in an operating mode wherein alternating current voltage is output using positive voltage of the direct current power supply input via the first switching element, negative voltage of the direct current power supply input via the second switching element, and voltage input via the bidirectional switch, a period in which polarities of output voltage and output current differ is such that, by the first and second switching elements being turned off, one switch element of the bidirectional switch being turned on in accordance with the polarities of the output voltage and output current, and the other switch element of the bidirectional switch being turned on and off based on an inverted signal of a signal pulse width modulated in accordance with an output voltage command, alternating current voltage obtained by synthesizing voltage input into the other end of the bidirectional switch and a pulse train voltage, which is voltage generated in accordance with the pulse width modulated signal whose amplitude corresponds to the positive voltage or negative voltage of the direct current power supply, is output.

2. The power converter according to claim 1, wherein the other end of the bidirectional switch is connected to an intermediate potential point of the direct current power supply.

3. An inverter device including the power converter according to claim 2.

4. The power converter according to claim 1, wherein the other end of the bidirectional switch is connected to a first end of an alternating current power supply of which a second end is connected to an intermediate potential point of the direct current power supply, and
   the sizes of the positive voltage and negative voltage of the direct current power supply, which have the intermediate potential point as a reference, are set to be greater than the amplitude value of the voltage of the alternating current power supply.

5. An inverter device including the power converter according to claim 4.

6. The power converter according to claim 1, wherein, in the operating mode, the second switching element and second switch element are turned off, the first switching element is turned on and off based on a first signal pulse width modulated in accordance with an output voltage command, and the first switch element is turned on and off based on a signal wherein an idle period is added to an inverted signal of the first signal, in a period in which the polarities of the output voltage and output current are both positive, the first switching element and first switch element are turned off, the second switching element is turned on and off based on a second signal pulse width modulated in accordance with an output voltage command, and the first switch element is turned on and off based on a signal wherein an idle period is added to an inverted signal of the second signal, in a period in which the polarities of the output voltage and output current are both negative, the first and second switching elements are turned off, the second switch element is turned on, and the second switch element is turned on and off based on an inverted signal of the first signal, in a period in which the output voltage is of positive polarity and the output current is of negative polarity, and the first and second switching elements are turned off, the second switch element is turned on, and the first switch element is turned on and off based on an inverted signal of the second signal, in a period in which the output voltage is of negative polarity and the output current is of positive polarity.

7. An inverter device including the power converter according to claim 6.

8. An inverter device including the power converter according to claim 1.

9. The power converter according to claim 1, comprising a control circuit configured to determine whether the polarities of the output voltage and output current differ, and, upon determining that the polarities of the output voltage and output current differ:

control the first and second switching elements to an off-state;

control the one switch element of the bidirectional switch to an on-state in accordance with the polarities of the output voltage and output current; and turn the other switch element of the bidirectional switch on and off based on the inverted signal of the signal pulse width modulated in accordance with the output voltage command.

10. A power converter, comprising:

first and second switching elements, to each of which a diode is connected in anti-parallel, connected in series to either end of a direct current power supply;

a first bidirectional switch, configured by first and second switch elements being connected in anti-series or anti-parallel, connected between a connection point of the first and second switching elements and the other end of an alternating current power supply of which one end is connected to an intermediate potential point of the direct current power supply; and a second bidirectional switch, configured by third and fourth switch elements being connected in anti-series or anti-parallel, connected between a connection point of the first and second switching elements and the intermediate potential point of the direct current power supply, wherein the sizes of the positive voltage and negative voltage of the direct current power supply, which have the intermediate potential point as a reference, are set to be greater than the amplitude value of the voltage of the alternating current power supply, and in a first operating mode wherein alternating current voltage is output using positive voltage of the direct current power supply input via the first switching element, negative voltage of the direct current power supply input via the second switching element, and intermediate voltage of the direct current power supply input via the second bidirectional switch, a period in which polarities of output voltage and output current differ is such that, by the first and second switching elements and first bidirectional switch being turned off, one switch element of the second bidirectional switch being turned on in accordance with the polarities of the output voltage and output current, and the other switch element of the second bidirectional switch being turned on and off based on an inverted signal of a signal pulse width modulated in accordance with an output voltage command, alternating current voltage obtained by synthesizing the intermediate voltage of the direct current power supply and a pulse train voltage, which is voltage generated in accordance with the pulse width modulated signal whose amplitude corresponds to the positive voltage or negative voltage of the direct current power supply, is output.

11. The power converter according to claim 10, wherein, in the first operating mode, the second switching element and first bidirectional switch are turned off, the third switch element is turned on, the first switching element is turned on and off based on a first signal pulse width modulated in accordance with an output voltage command, and the fourth switch element is turned on and off based on a signal wherein an idle period is added to an inverted signal of the first signal, in a period in which the polarities of the output voltage and output current are both positive, the first switching element and first bidirectional switch are turned off, the fourth switch element is turned on, the second switching element is turned on and off based on a second signal pulse width modulated in accordance with an output voltage command, and the third switch element is turned on and off based on a signal wherein an idle period is added to an inverted signal of the second signal, in a period in which the polarities of the output voltage and output current are both negative, the first and second switching elements and first bidirectional switch are turned off, the third switch element is turned on, and the fourth switch element is turned on and off based on an inverted signal of the first signal, in a period in which the output voltage is of positive polarity and the output current is of negative polarity, and the first and second switching elements and first bidirectional switch are turned off, the fourth switch element is turned on, and the third switch element is turned on and off based on an inverted signal of the second signal, in a period in which the output voltage is of negative polarity and the output current is of positive polarity.

12. An inverter device including the power converter according to claim 11.

13. An inverter device including the power converter according to claim 10.

14. The power converter according to claim 10, comprising a control circuit configured to determine whether the polarities of the output voltage and output current differ, and, upon determining that the polarities of the output voltage and output current differ:

control the first and second switching elements and the first bidirectional switch to an off-state;

control the one switch element of the second bidirectional switch to an on-state in accordance with the polarities of the output voltage and output current; and turn the other switch element of the second bidirectional switch on and off based on the inverted signal of the signal pulse width modulated in accordance with the output voltage command.

15. A power converter, comprising:

first and second switching elements, to each of which a diode is connected in anti-parallel, connected in series to either end of a direct current power supply;

a first bidirectional switch, configured by first and second switch elements being connected in anti-series or anti-parallel, connected between a connection point of the first and second switching elements and the other end of an alternating current power supply of which one end is connected to an intermediate potential point of the direct current power supply; and a second bidirectional switch, configured by third and fourth switch elements being connected in anti-series or anti-parallel, connected between a connection point of the first and second switching elements and the intermediate potential point of the direct current power supply, wherein the sizes of the positive voltage and negative voltage of the direct current power supply, which have the intermediate potential point as a reference, are set to be greater than the amplitude value of the voltage of the alternating current power supply, and in a second operating mode wherein alternating current voltage is output using positive voltage of the direct current power supply input via the first switching element, negative voltage of the direct current power supply input via the second switching element, and voltage of the alternating current power supply input via the first bidirectional switch, a period in which polarities of output voltage and output current differ is such that, by the first and second switching elements and second bidirectional switch being turned off, one switch element of the first bidirectional switch being turned on in accordance with the polarities of the output voltage and output current, and the other switch element of the first bidirectional switch being turned on and off based on an inverted signal of a signal pulse width modulated in accordance with an output voltage command, alternating current voltage obtained by synthesizing the voltage of the alternating current power supply and a pulse train voltage, which is voltage generated in accordance with the pulse width modulated signal whose amplitude corresponds to the positive voltage or negative voltage of the direct current power supply, is output.

16. The power converter according to claim 15, wherein, in the second operating mode, the second switching element and second bidirectional switch are turned off, the first switch element is turned on, the first switching element is turned on and off based on a first signal pulse width modulated in accordance with an output voltage command, and the second switch element is turned on and off based on a signal wherein an idle period is added to an inverted signal of the first signal, in a period in which the polarities of the output voltage and output current are both positive, the first switching element and second bidirectional switch are turned off, the second switch element is turned on, the second switching element is turned on and off based on a second signal pulse width modulated in accordance with an output voltage command, and the first switch element is turned on and off based on a signal wherein an idle period is added to an inverted signal of the second signal, in a period in which the polarities of the output voltage and output current are both negative, the first and second switching elements and second bidirectional switch are turned off, the first switch element is turned on, and the second switch element is turned on and off based on an inverted signal of the first signal, in a period in which the output voltage is of positive polarity and the output current is of negative polarity, and the first and second switching elements and second bidirectional switch are turned off, the second switch element is turned on, and the first switch element is turned on and off based on an inverted signal of the second signal, in a period in which the output voltage is of negative polarity and the output current is of positive polarity.

17. An inverter device including the power converter according to claim 16.

18. An inverter device including the power converter according to claim 15.

19. The power converter according to claim 15, comprising a control circuit configured to determine whether the polarities of the output voltage and output current differ, and, upon determining that the polarities of the output voltage and output current differ:

control the first and second switching elements and the second bidirectional switch to an off-state;

control the one switch element of the first bidirectional switch to an on-state in accordance with the polarities of the output voltage and output current; and turn other switch element of the first bidirectional switch on and off based on the inverted signal of the signal pulse width modulated in accordance with the output voltage command.

* * * * *